(12) United States Patent
Carter et al.

(10) Patent No.: US 8,261,112 B2
(45) Date of Patent: Sep. 4, 2012

(54) OPTIMIZING POWER CONSUMPTION BY TRACKING HOW PROGRAM RUNTIME PERFORMANCE METRICS RESPOND TO CHANGES IN OPERATING FREQUENCY

(75) Inventors: John B. Carter, Austin, TX (US); Heather L. Hanson, Austin, TX (US); Karthick Rajamani, Austin, TX (US); Freeman L. Rawson, III, Austin, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 12/330,284

(22) Filed: Dec. 8, 2008

(65) Prior Publication Data

US 2010/0146316 A1 Jun. 10, 2010

(51) Int. Cl.
*G06F 1/32* (2006.01)
*G06F 1/26* (2006.01)
*G06F 1/08* (2006.01)

(52) U.S. Cl. ........ 713/320; 713/300; 713/310; 713/321; 713/322; 713/324; 713/330; 713/340; 700/29; 702/75

(58) Field of Classification Search .................. 713/300, 713/310, 320–324, 330, 340; 700/29; 702/75
See application file for complete search history.

(56) References Cited

U.S. PATENT DOCUMENTS

| 7,340,378 | B1 | 3/2008 | Floyd et al. | |
| 2006/0253715 | A1* | 11/2006 | Ghiasi et al. | .................. 713/300 |
| 2007/0168055 | A1 | 7/2007 | Hsu et al. | |
| 2007/0234091 | A1 | 10/2007 | Vishin et al. | |

* cited by examiner

*Primary Examiner* — M Elamin
(74) *Attorney, Agent, or Firm* — Yudell Isidore Ng Russell, PLLC

(57) ABSTRACT

A method, system, and computer program product for optimizing power consumption of an executing processor executing. The method includes determining a first sensitivity relationship (SR) based on a first and a second performance metric value (PMV) measured at a first and second operating frequency (OF), respectively. The first SR predicts workload performance over a range of OFs. A third OF is determined based on the first SR and a specified workload performance floor. A third PMV is measured by executing the processor operating at the third OF. A second SR based on the second and third PMVs is then determined. The first and second SRs are logically combined to generate a third SR. Based on the third SR, a fourth OF is outputted.

20 Claims, 5 Drawing Sheets

OPTIMIZING POWER CONSUMPTION BY TRACKING HOW PROGRAM RUNTIME PERFORMANCE METRICS RESPOND TO CHANGES IN OPERATING FREQUENCY

BACKGROUND OF THE INVENTION

The present disclosure relates to reducing power consumption in computing environments, and more particularly to a performance-aware algorithm that dynamically adapts processor operating voltage and frequency settings to achieve significant power reduction with minimal impact on workload performance.

Computing performance (e.g., processor clock frequency) continues to improve at the expense of higher power consumption. According to Moore's Law of 1965, the number of transistors on a processor would double every 18 months. However, with each doubling in the number of transistors comes a corresponding increase in power consumption of compute nodes. High power consumption burdens the electrical supply load and increases operating costs, which results in a negative economic and environmental impact on society. In addition, when processor clock frequency is increased, processor(s) tend to generate increased heat. Increased heat can cause computing system reliability and productivity to deteriorate exponentially.

Power consumption by processors in a computing environment can be managed using Dynamic Voltage and Frequency Scaling (DVFS) techniques. Dynamic voltage scaling is a power management technique in computer architecture, where the voltage used in a component is increased or decreased, depending upon circumstances. Dynamic voltage scaling to increase voltage is known as overvolting. Dynamic voltage scaling to decrease voltage is known as undervolting. Undervolting is done in order to conserve power. Moreover, while undervolting can reduce power consumption, it can also lead to circuit failures if the applied input voltage is not matched with a corresponding decrease in clock frequency. Overvolting is done in order to allow one to increase the clock frequency of the processor, which in turn can increase computing performance. Dynamic frequency scaling is another power management technique in computer architecture where a processor is run at a less-than-maximum frequency in order to conserve power.

DVFS techniques are commonly used in laptops and other mobile devices, where energy comes from a battery and thus is limited. In addition, DVFS is also used in quiet computing settings and to decrease energy and cooling costs for lightly loaded computing machines. Less heat output, in turn, allows the system cooling fans to be throttled down or turned off, further decreasing power consumption. DVFS is also used for reducing heat in badly cooled computing systems when the temperature reaches a certain level. Most computing systems affected by increased heat are inadequately cooled overclocked systems. DVFS allows a processor to switch between different frequency-voltage settings at run time under the control of software. Examples of software employing DVFS techniques include powerNow! (AMD) and SpeedStep (Intel).

However, the power-performance tradeoffs provided by the DVFS techniques should be used judiciously. A computer user is seldom willing to sacrifice performance in exchange for lower power consumption. Thus, one goal for power management methodology via DVFS is to create a schedule of the use of processor clock frequency-voltage settings over time so as to reduce processor power consumption while minimizing performance degradation. A DVFS scheduling algorithm needs to determine when to adjust the current frequency-voltage setting (i.e., scaling point) and to which new frequency-voltage setting (i.e., scaling factor) the computing system is adjusted. For example, a DVFS scheduling algorithm may set the scaling points at the beginning of each fixed-length time interval and determine the scaling factors by predicting the upcoming processor workload based on the past history.

Existing DVFS algorithms possess a number of drawbacks. For example, DVFS algorithms may be too pessimistic in predicting future processor workload and lose great opportunities in exploiting DVFS for maximum power savings. Many existing DVFS algorithms assume that the performance of an application scales perfectly with respect to processor clock frequency, i.e., the computing system's performance will be halved if processor clock frequency is reduced by half. It is only in the worst case that the execution time doubles when the processor clock frequency is halved. Thus, a DVFS scheduling algorithm based on such a model will schedule a faster processor clock frequency and complete a task far ahead of its deadline, whereas a slower processor clock frequency can be scheduled that still meets its performance deadline (e.g., guaranteed transaction rate), but consumes less power.

In addition, other existing DVFS algorithms are geared to executing High Performance Computing (HPC) applications. These DVFS algorithms assume a workload having a fairly constant degree of frequency sensitivity. These types of HPC driven DVFS algorithms apply curve/line fitting techniques using a single set of performance data that is calculated over a predetermined range of allowed operating frequencies. As a result, the single set of performance data is updated only for the last performance metric reading at a test frequency, which when incorporated with the previous measured values within the set, may result in a slower response to actual and frequent changes in workload frequency sensitivity. This is because many of the values within the single set may be significantly outdated (i.e., erroneously reflecting a frequency-performance relationship for an earlier-executed workload or earlier phase in a current workload).

Computer system performance can depend on whether the operations that are being executed by the processor are core-bound (or processor-bound) operations or non-core-bound (or non-processor-bound) operations. Core-bound operations do not have to go outside the core for their completion. When a processor is executing core-bound instructions, then the rate in which the processor can complete the instructions is directly proportional to how fast the processor is clocked.

In contrast, non-core-bound operations need to go outside the core for their completion. Core-bound operations generally refer to high latency operations/instructions that have a stronger likelihood of inducing processor pipeline bubbles. For example, retrieving data from L2 and L3 caches, while on-chip, can have moderately long latencies of 8-60 cycles. Moreover, in the case of DRAM accesses, there can be even longer latencies (e.g., 200+ cycles). To improve performance and avoid such bottlenecks as waiting to retrieve data or waiting for an input signal, instruction pipeline processing is employed in processors to allow overlapping execution of multiple instructions with the same circuitry. There are instances, however, when an instruction in the pipeline depends on the completion of a previous instruction in the pipeline.

For example, FIG. 1A shows a stack of instructions 100 that are processed at a maximum operating frequency, according to one embodiment. At row 101, the first instruction is a load operation in which a value X is loaded and stored in memory register RO. Subsequent instructions at rows 102-105 are instructions that do not depend on the completion of a previous instruction for their execution. However, the instruction at row 106 is a multiplication operation that requires the updated value of RO that is obtained by instruction 101. If the completion of load instruction 101 is delayed (e.g., value X must be loaded from a memory that is outside the core), a load latency is created and the processor must wait until instruction 101 is completed. Since the processor is operating at a maximum operating frequency, there are cycles that are potentially wasted (i.e., no instructions are executed during these wasted cycles) in waiting for instruction 101 to complete. The wasted cycles that are present in the example is referred to as the architectural slack of the processor. In the example shown, there is an 8-cycle load latency in waiting for instruction 101 to complete if the processor is running at maximum (100%) operating frequency.

In such instances as described in FIG. 1A, lowering the operating frequency may not significantly impair performance due to the inherent load latency in completing a previous instruction. Referring now to FIG. 1B, the same instruction stack as shown in FIG. 1A is shown, except that the processor is now processing at 50% of its maximum operating frequency. Thus, instead of an 8-cycle load latency that is present when the processor is processing at 100% of its maximum operating frequency, the load latency is reduced by half (i.e., 4-cycle load latency) when the processor is processing at 50% of its maximum operating frequency. Notably, the halving of the operating frequency does not necessarily imply a 50% reduction in the instructions being completed within a given time period. Such processing systems can be described as being "frequency insensitive". In practice, main memory latency can be much larger (e.g., 200+ cycles) than what is represented in the example shown in FIGS. 1A and 1B. Thus, larger power consumption savings can be realized by taking advantage of the architectural slack in a processing system, while not significantly compromising processing performance.

SUMMARY OF THE ILLUSTRATIVE EMBODIMENTS

A method, system, and computer-readable storage medium for optimizing power consumption of an executing processor are disclosed. The method includes determining a first sensitivity relationship based on a first performance metric value and a second performance metric value. The first and second performance metric values correspond respectively to a first operating frequency of the processor and a second operating frequency of the processor. Thus, the first performance metric value is derived from an execution of a processor operating at a first operating frequency, and the second performance metric value is derived from an execution of a processor operating at a second operating frequency. The first sensitivity relationship predicts workload performance of the processor over a range of operating frequencies. A third operating frequency of the processor is determined based on the first sensitivity relationship. The third operating frequency corresponds to a workload performance floor. The performance floor is a minimum level of processor performance, which is often relative to the performance achievable if the processor were run at a maximum frequency. A third performance metric value is determined from an execution of the processor operating at the third operating frequency. A second sensitivity relationship is then determined. The second sensitivity relationship is based on the second performance metric value and third performance metric values. The second and third performance metric values correspond respectively to the second and third operating frequencies. The first and second sensitivity relationships are logically combined to generate a third sensitivity relationship. Based on the third sensitivity relationship, a fourth operating frequency of the processor is outputted.

The above as well as additional objectives, features, and advantages of the present invention will become apparent in the following detailed written description.

BRIEF DESCRIPTION OF THE SEVERAL VIEWS OF THE DRAWINGS

Aspects of the invention itself will best be understood by reference to the following detailed description of an illustrative embodiment when read in conjunction with the accompanying drawings, where.

DETAILED DESCRIPTION OF THE INVENTION

Figures 1A, 1B:
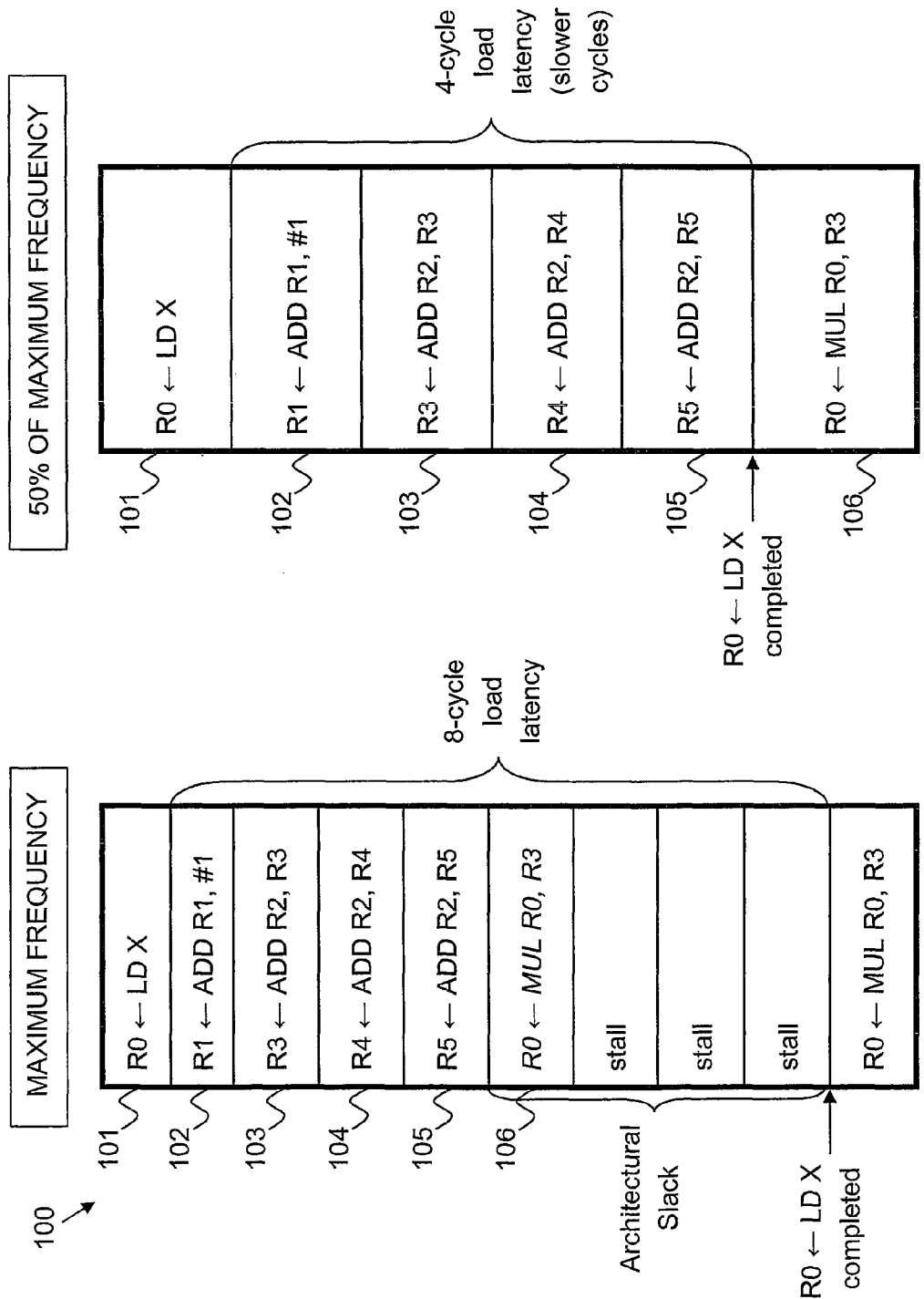
FIG. 1A illustrates the concept of load latency in an instruction stack that is processed at a maximum operating frequency, in accordance with one embodiment of the invention.
FIG. 1B illustrates the concept of load latency in the instruction stack of FIG. 1, but processed at an operating frequency that is 50% of the maximum operating frequency, in accordance with one embodiment of the invention.
Figure 2:
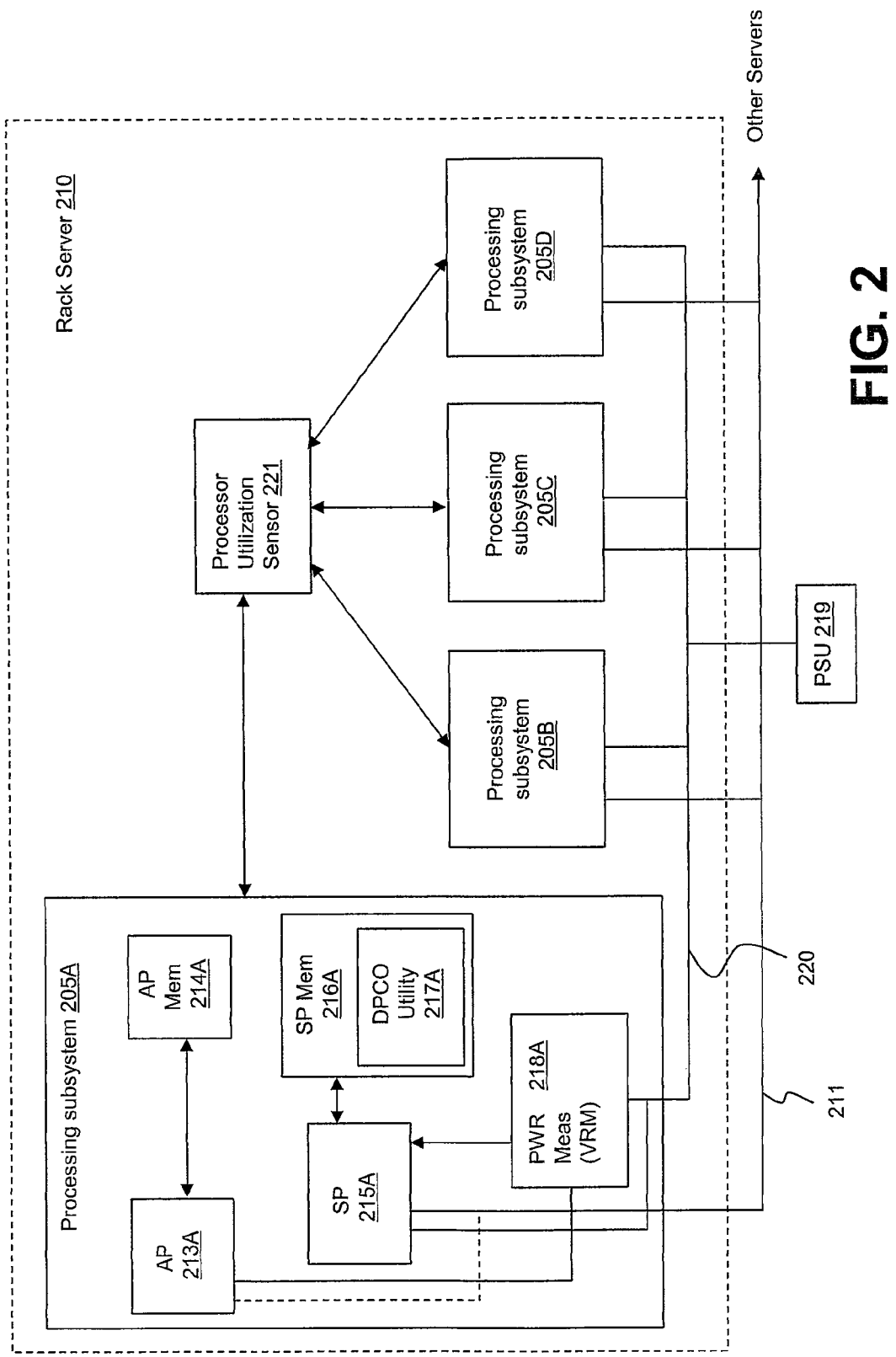
FIG. 2 is a schematic block diagram of a multiple processing unit computing system in accordance with an embodiment of the invention.

With reference now to FIG. 2, a processing system is depicted in accordance with an embodiment of the present disclosure. Processing subsystems 205A-205D illustrate identical sub-units of an overall processing system, rack server 210, interconnection between processing subsystems 205A-205D is provided by an interconnect 211 that can also provide connection of the system to peripheral devices. Such connections and devices generally exist in processing systems and are understood in the art and can take on a variety of interconnect forms. The techniques of the present invention can also be applied in large-scale systems encompassing multiple rack servers 210 or other groups of computing systems.

Within processing subsystem 205A, an application processor (AP) 213A is coupled to an application memory (AP Mem) 214A, which generally represent the processor and storage per processing system that run operating environments, virtual machines, server instances and/or other tasks associated with the primary functions of the computing system. Also within processing system 205A (and similarly for the other identical processing systems 205B-205D), a service processor (SP) 215A provides control and monitoring functions for processing system 205A. Service processor 215A is coupled to a service processor memory (SP Mem) 216A that stores service processor program instructions and data that provides the power measurement data collected and analyzed in the techniques of the present disclosure. According to current embodiment, SP Mem 216A stores Dynamic Power Consumption Optimization (DPCO) utility 217A, which is described in further detail in FIG. 3 below. Service processor 215A in conjunction with DPCO utility 217A controls the frequency and optionally the core voltage of application processor 213A and can halt application processor 213A, change external clocks or re-program phase-lock loop (PLL) divider factors and alter the power supply output voltages to change the power consumed by application processor 213A.

A power supply unit (PSU) 219 provides power to processing subsystems 205A-205D through one or more power interconnects 220 and may comprise more than one power supply unit 219 operating in tandem (e.g., separate PSUs 219 for each of other identical processing systems 205B-205D). Power measuring unit 218A may be incorporated within a voltage regulator module (VRM) that provides for voltage regulation in addition to current measurement, and in particular, voltage control in response to a digital signal that selects the processor voltage as part of the power management schemes described herein. Power measuring unit 218A is configured to measure the power supplied to application processor 213A, so that the distribution of the measured power can be used as an indicator of the utilization of application processor 213A. However, the power measurement may alternatively include the entire processing subsystem 205A if the power consumption of service processor 215A and service processor memory 216A is negligible or constant, and the power consumed by AP memory 214A is either negligible or tracks the variation in power consumed by application processor 213A. In addition a processor utilization sensor 221 is configured to measure the level of processor utilization, or conversely, the level of processor idling.

While FIG. 2 provides a concrete example of an architecture that implements the above-described performance estimating technique, the depicted architecture should not be construed as limiting or exhaustive. Rather, the depicted architecture represents and/or highlights certain components that may be utilized to practice the present invention. Variations of the illustrated components and architecture are within the spirit and scope of the present invention. For example, the processor utilization of a uniprocessor system may also be estimated, just as each subsystem (e.g., processor, memory, and I/O subsystems) is independently monitored and a processor utilization estimate generated for each processor in the above-described embodiment. A VRM such as one incorporating power measurement unit 218A receives commands from service processors, such as service processor 215A, to adjust the voltage supplied to application processors, such as application processor 213A, in conformity with a selected operating frequency. The selected operating frequency and voltage of the processors can be determined in conformity with the results of the utilization estimate for the processor, so that the most efficient operation of the system is achieved. Moreover, in other embodiments, DPCO utility can be executed directly from application processor 213A without the use of an intermediate processor, such as service processor 215A. According to another embodiment, application processor 213A and service processor 215A can be located on the same die, such that service processor 215A is configured as a separate functional unit within application processor 213A.

Figure 3:
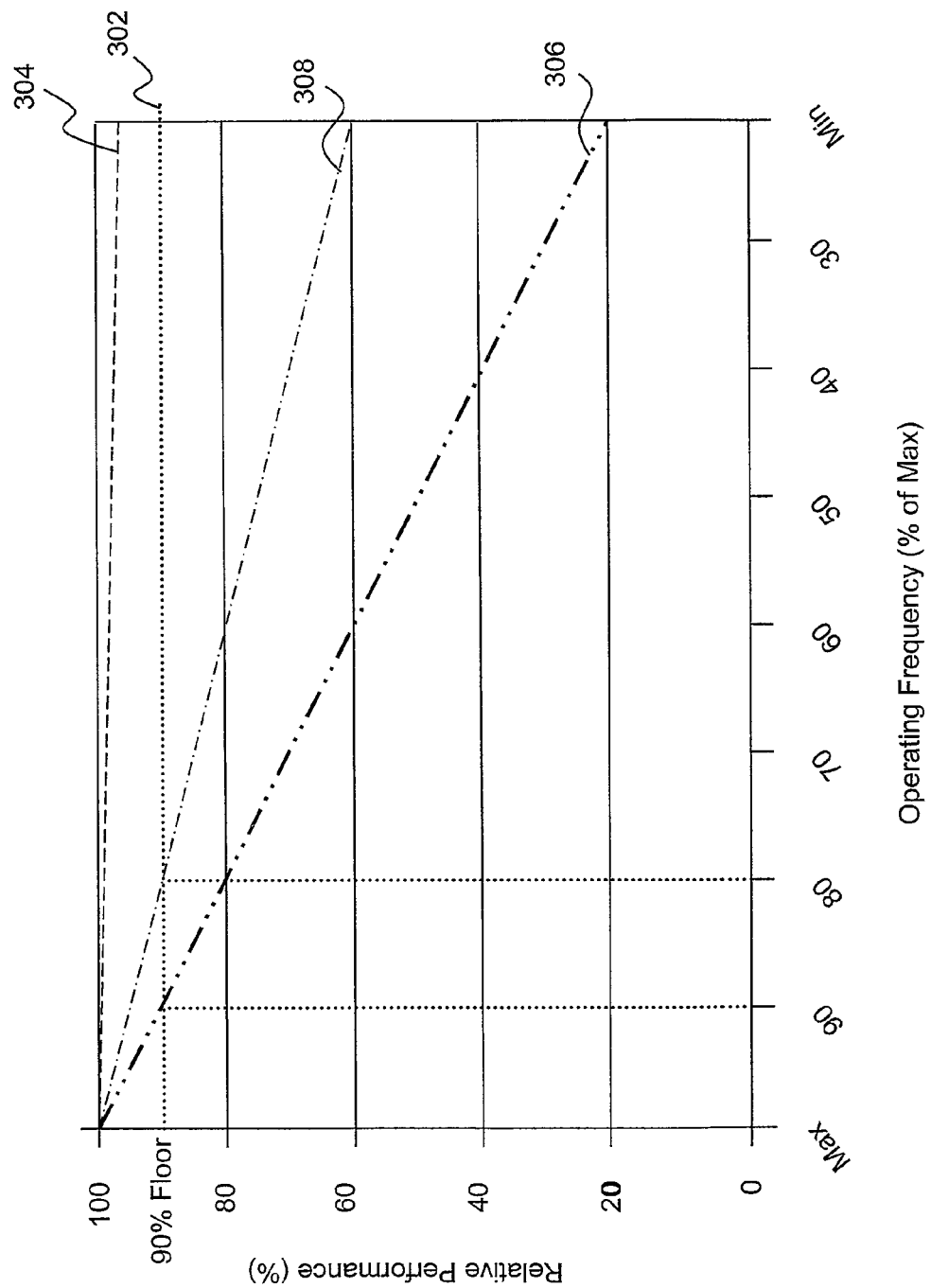
FIG. 3 is a line chart illustrating performance sensitivity to changes in operating frequency in the exemplary processing unit, in accordance with one embodiment of the invention.

Referring now to FIG. 3, a line chart 300 is shown that illustrates performance sensitivity to changes in operating frequency in an exemplary processing system running a particular application. The x-axis of line chart 300 illustrates operating frequency as a percentage of a processor's maximum operating frequency. The y-axis of line chart 300 illustrates a relative performance of the processor as a percentage of the performance that would be realized at the processor's maximum operating frequency. Line 302 indicates a user-specified or system-specified performance floor (e.g., 90% of performance that would have been achieved at maximum operating frequency) that is applied to the processing system. Line 304 indicates a processing system that is insensitive to changes in operating frequency. Line 306 indicates a processing system that is highly sensitive to changes in operating frequency. Line 308 indicates a processing system that is moderately sensitive to changes in operating frequency.

According to an embodiment of the invention, each line 304-308 illustrates a sensitivity relationship between a first performance metric value derived from an execution of a processor operating at a first operating frequency, and a second performance metric value derived from an execution of the processor operating at a second operating frequency.

Figure 4A:
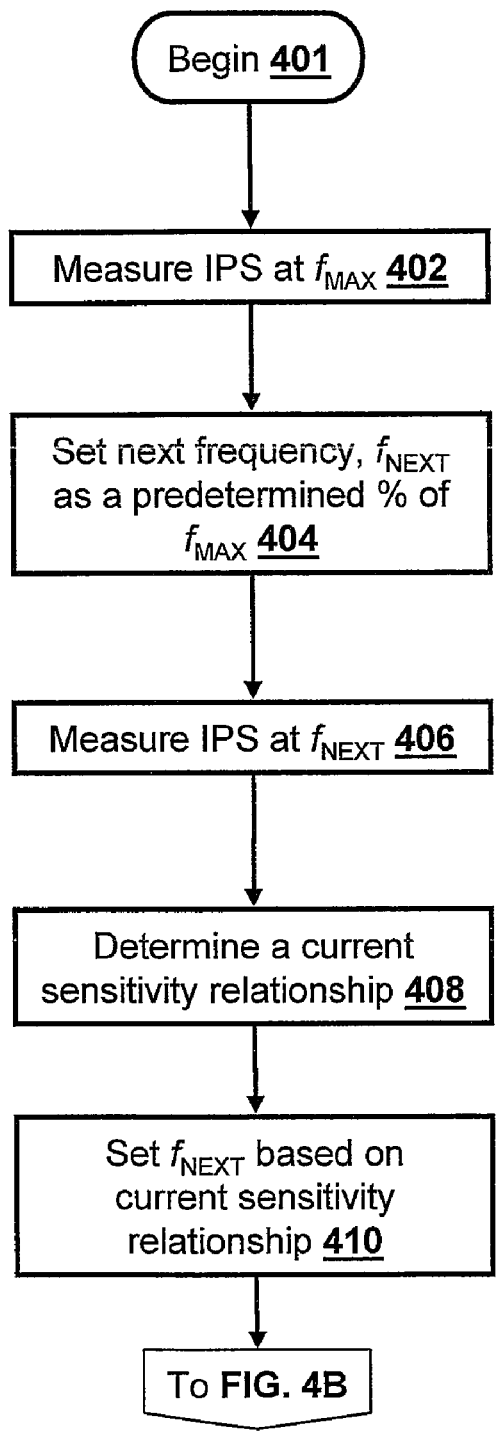
FIGS. 4A and 4B represent portions of a high-level flow diagram of exemplary method steps taken to implement dynamic power consumption optimization in accordance with an embodiment of the present invention.
Figure 4B:
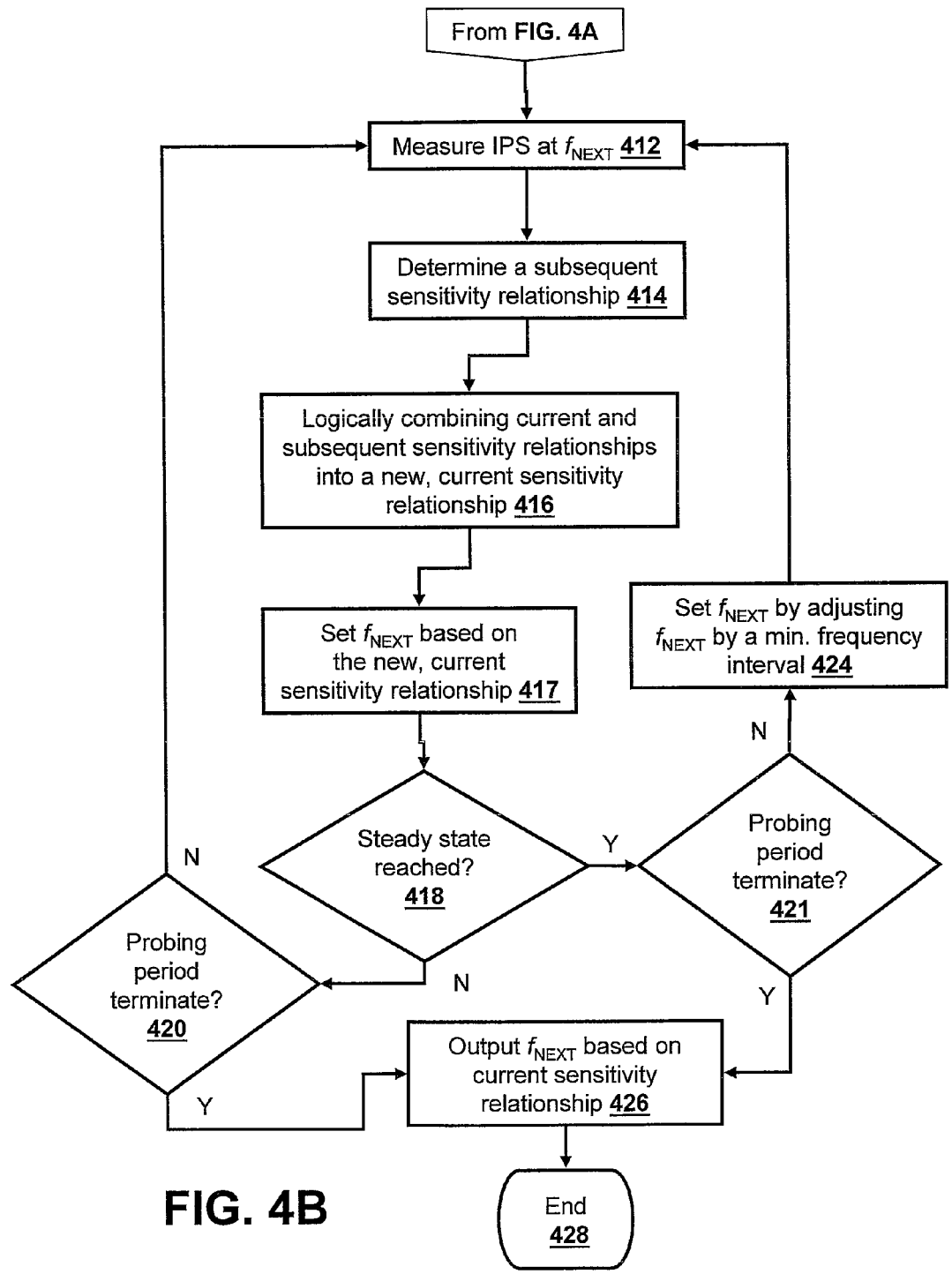

FIGS. 4A and 4B represent a flow chart, which illustrates a method for optimizing power consumption of a processor executing an active computing event (i.e., a computer program or application) in accordance with an embodiment of the present disclosure. It should be appreciated that the optimization method can be applied on a per-core (i.e., in a multi-core chip), per-chip, and/or per-partition (i.e., groups of cores located on the same or different chips) basis. The method begins at start block 401 and proceeds to block 402 where a performance metric value is measured and recorded at a maximum operating frequency. A performance metric value is any value that relates to the performance of a processor when executing an active computing event. According the exemplary embodiment shown in FIGS. 4A and 4B, the performance metric value is the number of Instructions Per Second (IPS) executed by the processor. Moreover, each processor is predetermined to operate between a particular maximum operating frequency, $f_{MAX}$ and a particular minimum operating frequency, $f_{MIN}$. From block 402, the process continues to block 404, where the processor's operating frequency is set to another predetermined frequency value, $f_{NEXT}$, which is a predetermined percentage of $f_{MAX}$. For example, $f_{NEXT}$ may be initially set to 95% of $f_{MAX}$. The IPS are then measured and recorded at $f_{NEXT}$ (e.g., 95% of $f_{MAX}$), as depicted in block 406. It should be recognized that the invention is not limited to measuring the number of IPS executed by a processor. Rather any number of types of performance metrics can be used to measure the performance of a processor.

At block 408, an initial sensitivity relationship is determined. The initial sensitivity relationship is based on the measured IPS when the processor's operating frequency is set to $f_{MAX}$, as well as the measured IPS when the processor's operating frequency is changed to the predetermined percentage of $f_{MAX}$ (i.e., $f_{NEXT}$). If one were to plot the above IPS values for their respective operating frequencies, two points would be yielded. From these two points, a line can be drawn. The line represents the initial sensitivity relationship that predicts workload performance over the entire operating frequency range of the processor.

The method continues to block 410, where the operating frequency of the processor is set to a next operating frequency, which for purposes of generality will continue to be labeled $f_{NEXT}$. The new value for $f_{NEXT}$ is based on the most current sensitivity relationship, labeled "current" sensitivity relationship in block 410. According to the exemplary embodiment shown in FIGS. 4A and 4B, the most current sensitivity relationship until now has been the initial, or first, sensitivity relationship. The new value for $f_{NEXT}$ is determined as the lowest legal frequency to achieve performance that exceeds a performance floor, as shown for example in line 302 of FIG. 3. Using FIG. 3 as an example, if it is assumed that the initial sensitivity relationship is depicted by line 306, then the lowest operating frequency that can be set (i.e., the new value for $f_{NEXT}$) is located at a point of intersection between performance floor (e.g., line 302) and the initial sensitivity relationship (e.g., line 306). According to this example, the point of intersection corresponds to an operating frequency that is 90% of the maximum frequency. The method then continues to FIG. 4B.

With reference now to FIG. 4B, using the new value for $f_{NEXT}$, an IPS metric value is then measured, as depicted in block 412. Once an IPS value has been determined for the new value of $f_{NEXT}$ (e.g., 90% of $f_{MAX}$), a "subsequent" sensitivity relationship can be determined (block 414) using the previous IPS value corresponding to the immediately previous value of $f_{NEXT}$ (e.g., 95% of $f_{MAX}$). From block 414, the method continues to block 416 where the "current" sensitivity relationship (derived in block 408) is logically combined with the "subsequent" or second sensitivity relationship (derived in block 414), resulting in a new, sensitivity relationship labeled for generality purposes as the new, "current" sensitivity relationship. According to one embodiment of the disclosure, the sensitivity relationships are logically combined by averaging the two sensitivity relationships.

From block 416, the method continues to block 417, where a new value for $f_{MAX}$ is determined based on the new, "current" sensitivity relationship (from block 416). In this regard, the new value for $f_{MAX}$ is determined in similar fashion as shown in block 410. From block 417, the method continues to decision block 418, where DPCO utility 217A determines whether a "steady state" sensitivity relationship has been reached. To determine whether a "steady state" or constant sensitivity relationship has been reached, DPCO utility 217A compares the new value of $f_{NEXT}$ (i.e., which is derived from the averaged sensitivity relationship derived in block 416) with the previous $f_{NEXT}$ value (i.e., which is derived from the "subsequent" sensitivity relationship derived in block 414). It should be appreciated, however, that over the course of a plurality of probe cycles within a probing period, the "subsequent" sensitivity relationship derived in block 414 will be comprised of a running average of the previously determined sensitivity relationships within the probing period. From the comparison discussed above, it is determined whether $f_{NEXT}$ has changed (i.e., not in steady state) or remained constant (i.e., in steady state).

If steady state has not been reached, the method continues to decision block 420, where it is determined whether a probing period for determining an optimal operating frequency has terminated or timed out. According to one embodiment of the disclosure, the probing period is a predetermined period of time in which DPCO utility 217A assists service processor 215A in dynamically regulating an operating frequency for processing subsystem 205A, which results in a minimum amount of power consumption, while maintaining a minimum performance floor.

A probing period includes a plurality of probe cycles. Each probe cycle comprises, at a minimum, (a) setting the processor to an operating frequency, and (b) measuring the performance (e.g., executed instructions per second) of the processor at the set operating frequency. For probe cycles that occur after the initial determination of an initial sensitivity relationship (which is based on predetermined sample operating frequencies), these probe cycles set their operating frequency based upon a previously determined sensitivity relationship and then recalculate a new sensitivity relationship using the frequency-performance values from the previous probe cycles. As described earlier, DPCO utility 217A averages a series of individual, sensitivity relationships over the course of a probing period. As each sensitivity relationship is determined sequentially, the most recently determined sensitivity relationship is then included in a running average of the previously determined sensitivity relationships within the current probing period. However, it should be noted that averaging previous sensitivity relationships is not the only way to combine previously calculated sensitivity relationships. Moreover, according to another embodiment of the disclosure, the combination used to select the new sensitivity relationship, and hence the new frequency, can involve an arbitrary function of a stream of previous sensitivity relationships. Such arbitrary functions include, for example, weighted average, maximum, minimum, and the like.

Under current processor hardware architecture, the fastest that a probe cycle can be run is every 32 ms. However, it should be recognized that the invention is not limited in this regard, and that a probe cycle may be set to occur at a time value that is slower than a rate of 32 ms per probe cycle or faster than a rate of 32 ms per probe cycle (assuming processor hardware architecture capabilities are amplified). Moreover, the probing period can be set for any period of time by the system or user. According to one embodiment of the invention, the probing period can terminate and reset to a new probing period every 8 seconds (which permits approximately 250 probe cycles assuming a probing rate of 32 ms). However, it should be recognized that the invention is not limited in this regard.

According to another embodiment of the invention, the probing period can be prematurely terminated and reset if processor utilization sensor 221 (FIG. 2) detects within a probe cycle that the processor has been idling for a threshold period of time (e.g., during 75% of the probe cycle). On the other hand, if processor utilization sensor 221 detects processor idling within a probe cycle that fails to exceed the threshold, DPCO utility 217A will extrapolate an expected performance metric based on the performance achieved during the period within the probe cycle in which the processor was not idling and continue the probe cycle.

If it is determined that the probing period has not terminated, the method continues in iterative fashion to block 412 to measure the performance (e.g., IPS) of the new, current operating frequency $f_{NEXT}$. However, if it is determined that the probing period has terminated, the method continues to block 426 where the next frequency based on the current sensitivity relationship is outputted from service processor 215A and the probing period is reset to the next probing period and all values derived from the previous probing period are removed, which commences at start block 401. From block 426, the method ends at termination block 428.

Returning to decision block 418, if it is determined that a steady state has been reached, the method continues to decision block 421. Similar to decision block 420, decision block 421 determines whether the probing period has terminated. If it is determined in decision block 420 that the probing period has not terminated, the method continue to block 424, where the next operating frequency is set by adjusting $f_{NEXT}$ by a minimum frequency interval. In this regard, the next operating frequency $f_{NEXT}$ is randomly increased or decreased by the minimum frequency interval, e.g., from 1 GHz+/−0.1 GHz (if the minimum frequency interval is 0.1 GHz). However, it should be noted that the next frequency adjustment cannot violate processor performance limitations, such as setting $f_{NEXT}$ at a frequency value that is greater than $f_{MAX}$ or less than $f_{MIN}$. From block 424, the method returns in iterative fashion to block 412 where the performance metric (e.g., IPS) of $f_{NEXT}$ is measured. However, if it is determined at decision block 420 that the probing period has terminated, the method continues to block 426 where the probing period is reset to the next probing period and all values derived from the previous probing period are removed. The next probing period then commences at start block 401, as previously described.

According to another embodiment of the disclosure, instead of discarding the values previously derived from the previous probing period, the last recorded probe cycle frequency from the previous probing period is used as the next operating frequency of the second phase cycle of the next probing period. According to this embodiment, this last recorded probe cycle frequency replaces the predetermined frequency that is derived in block 404 (i.e., the predetermined % of maximum frequency).

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a tangible computer-usable storage medium having computer-usable program code embodied in the storage medium and therein processable by a computer. Moreover, the present invention can be implemented in all classes of computing systems, such as standalone server systems and embedded systems (e.g., such as in wireless communication devices)

Any suitable tangible computer-usable or computer-readable storage medium may be utilized. The tangible computer-usable or computer-readable storage medium may be, for example but not limited to, an electronic, magnetic, optical, electromagnetic, infrared, or semiconductor system, apparatus, device, or propagation medium. More specific examples (a non-exhaustive list) of the tangible computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the tangible, computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer data storage. In the context of this document, a tangible computer-usable or computer-readable storage medium may be any medium that can contain, store, communicate, propagate, or transport the program for use by or in connection with the instruction execution system, apparatus, or device. The computer-usable storage medium may include a propagated data signal with the computer-usable program code embodied therewith, either in baseband or as part of a carrier wave. The computer-usable program code may be transmitted using any appropriate medium, including but not limited to the Internet, wireline, optical fiber cable, RF, etc.

Computer program code for carrying out operations of the present invention may be written in an object oriented programming language such as Java® (JAVA is a trademark or registered trademark of Sun Microsystems, Inc. in the United States and other countries), Smalltalk® (SMALLTALK is a trademark or registered trademark of Cincom Systems, Inc.), C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable data storage that can direct a computer or other programmable data processing apparatus to function in a particular manner, such that the instructions stored in the computer-readable data storage produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions/acts specified in the flowchart and/or block diagram block or blocks.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implemented method for optimizing power consumption of an executing processor, said method comprising:
   a computer determining a first sensitivity relationship based on a first performance metric value corresponding to a first operating frequency of the processor and a second performance metric value corresponding to a second operating frequency of the processor, wherein said first sensitivity relationship predicts workload performance of the processor over a range of operating frequencies;
   the computer determining a third operating frequency of the processor based on said first sensitivity relationship, wherein said third operating frequency corresponds to a workload performance floor;
   the computer determining a third performance metric value derived from an execution of said processor operating at said third operating frequency;
   the computer determining a second sensitivity relationship based on said third performance metric value corresponding to said third operating frequency and said second performance metric value corresponding to said second operating frequency;
   the computer logically combining said first sensitivity relationship and said second sensitivity relationship to generate a third sensitivity relationship; and
   the computer outputting a fourth operating frequency of the processor based on said third sensitivity relationship.

2. The computer-implemented method of claim 1, further comprising:
   determining a fourth performance metric value derived from an execution of said processor operating at said fourth operating frequency;
   determining a fourth sensitivity relationship based on said fourth performance metric value corresponding to said fourth operating frequency and said third performance metric value corresponding to said third operating frequency; and
   logically combining said third sensitivity relationship and said fourth sensitivity relationship to generate a fifth sensitivity relationship, wherein said third sensitivity relationship is an running average of previously determined sensitivity relationships within a probing period.

3. The computer-implemented method of claim 1, further comprising:
   determining said first performance metric value derived from an execution of said processor operating at said first operating frequency, wherein said first operating frequency is a predetermined maximum operating frequency; and
   determining said second performance metric value derived from said execution of said processor operating at said second operating frequency, wherein said second operating frequency is a predetermined percentage value of said predetermined maximum operating frequency.

4. The computer-implemented method of claim 3, wherein said determining first performance metric further comprises:
   measuring a plurality of initial performance metric values derived from said execution of said processor operating at said predetermined maximum operating frequency; and
   averaging said plurality of initial performance metric values.

5. The computer-implemented method of claim 1, further comprising:
   determining whether said third sensitivity relationship has reached a steady state when compared to said second sensitivity relationship;
   if said steady state has been reached:
      adjusting said third operating frequency by a minimum frequency interval, wherein said adjusted operating frequency is said fourth operating frequency; and
      determining a fourth performance metric value derived from an execution of said processor operating at said fourth operating frequency; and
   if said steady state has not been reached, determining said fourth operating frequency based on said third sensitivity relationship, wherein said fourth operating frequency corresponds to said workload performance floor.

6. The computer-implemented method of claim 1, further comprising:
   determining said first performance metric value derived from an execution of said processor operating at said first operating frequency, wherein said first operating frequency is a predetermined maximum operating frequency; and
   determining said second performance metric value derived from said execution of said processor operating at said second operating frequency, wherein said second operating frequency is a final operating frequency entry of a previous frequency probing period.

7. The computer-implemented method of claim 1, further comprising resetting to a new frequency probing period in response to detecting a idle processing cycle within a current frequency probing period.

8. A system for optimizing power consumption of an executing processor, comprising:
   a service processor; and
   a memory coupled to said service processor; and a dynamic power consumption optimizing utility stored within said memory and executable on said service processor for:
   determining a first sensitivity relationship based on a first performance metric value corresponding to a first operating frequency of the processor and a second performance metric value corresponding to a second operating frequency of the processor, wherein said first sensitivity relationship predicts workload performance of the processor over a range of operating frequencies;
   determining a third operating frequency of the processor based on said first sensitivity relationship, wherein said third operating frequency corresponds to a workload performance floor;
   determining a third performance metric value derived from an execution of said processor operating at said third operating frequency;
   determining a second sensitivity relationship based on said third performance metric value corresponding to said third operating frequency and said second performance metric value corresponding to said second operating frequency;
   logically combining said first sensitivity relationship and said second sensitivity relationship to generate a third sensitivity relationship; and
   outputting a fourth operating frequency of the processor based on said third sensitivity relationship.

9. The system of claim 8, said dynamic power consumption optimizing utility further comprising executable code for:
   determining a fourth performance metric value derived from an execution of said processor operating at said fourth operating frequency;
   determining a fourth sensitivity relationship based on said fourth performance metric value corresponding to said fourth operating frequency and said third performance metric value corresponding to said third operating frequency; and
   logically combining said third sensitivity relationship and said fourth sensitivity relationship to generate a fifth sensitivity relationship, wherein said third sensitivity relationship is an running average of previously determined sensitivity relationships within a probing period.

10. The system of claim 8, said dynamic power consumption optimizing utility further comprising executable code for:
   determining said first performance metric value derived from an execution of said processor operating at said first operating frequency, wherein said first operating frequency is a predetermined maximum operating frequency; and
   determining said second performance metric value derived from said execution of said processor operating at said second operating frequency, wherein said second operating frequency is a predetermined percentage value of said predetermined maximum operating frequency.

11. The system of claim 10, wherein said determining first performance metric further comprises:
   measuring a plurality of initial performance metric values derived from said execution of said processor operating at said predetermined maximum operating frequency; and
   averaging said plurality of initial performance metric values.

12. The system of claim 8, further comprising executable code for:
   determining whether said third sensitivity relationship has reached a steady state when compared to said second sensitivity relationship;
   if said steady state has been reached:
      adjusting said third operating frequency by a minimum frequency interval, wherein said adjusted operating frequency is said fourth operating frequency; and
      determining a fourth performance metric value derived from an execution of said processor operating at said fourth operating frequency; and
   if said steady state has not been reached, determining said fourth operating frequency based on said third sensitivity relationship, wherein said fourth operating frequency corresponds to said workload performance floor.

13. The system of claim 8, further comprising executable code for:
   determining said first performance metric value derived from an execution of said processor operating at said first operating frequency, wherein said first operating frequency is a predetermined maximum operating frequency; and
   determining said second performance metric value derived from said execution of said processor operating at said second operating frequency, wherein said second operating frequency is a final operating frequency entry of a previous frequency probing period.

14. The system of claim 8, further comprising executable code for resetting to a new frequency probing period in response to detecting a idle processing cycle within a current frequency probing period.

15. A computer program product comprising:
   a non-transitory computer storage medium having stored therein program code that, when executed, optimizes power consumption of an executing processor said program code comprising:
      program code configured for determining a first sensitivity relationship based on a first performance metric value corresponding to a first operating frequency of the processor and a second performance metric value corresponding to a second operating frequency of the processor, wherein said first sensitivity relationship predicts workload performance of the processor over a range of operating frequencies;
      program code configured for determining a third operating frequency of the processor based on said first sensitivity relationship, wherein said third operating frequency corresponds to a workload performance floor;
      program code configured for determining a third performance metric value derived from an execution of said processor operating at said third operating frequency;
      program code configured for determining a second sensitivity relationship based on said third performance metric value corresponding to said third operating frequency and said second performance metric value corresponding to said second operating frequency;
      program code configured for logically combining said first sensitivity relationship and said second sensitivity relationship to generate a third sensitivity relationship; and
      program code configured for outputting a fourth operating frequency of the processor based on said third sensitivity relationship.

16. The computer program product of claim 15, further comprising:
   program code configured for determining said first performance metric value derived from an execution of said processor operating at said first operating frequency, wherein said first operating frequency is a predetermined maximum operating frequency; and program code configured for determining said second performance metric value derived from said execution of said processor operating at said second operating frequency, wherein said second operating frequency is a predetermined percentage value of said predetermined maximum operating frequency.

17. The computer program product of claim 16, wherein said program code configured for determining the first performance metric further comprises:

program code configured for measuring a plurality of initial performance metric values derived from said execution of said processor operating at said predetermined maximum operating frequency; and program code configured for averaging said plurality of initial performance metric values.

18. The computer program product of claim 15, further comprising:

program code configured for determining whether said third sensitivity relationship has reached a steady state when compared to said second sensitivity relationship;

program code configured for, if said steady state has been reached, adjusting said third operating frequency by a minimum frequency interval, wherein said adjusted operating frequency is said fourth operating frequency, and determining a fourth performance metric value derived from an execution of said processor operating at said fourth operating frequency; and program code configured for, if said steady state has not been reached, determining said fourth operating frequency based on said third sensitivity relationship, wherein said fourth operating frequency corresponds to said workload performance floor.

19. The computer program product of claim 15, further comprising:

program code configured for determining said first performance metric value derived from an execution of said processor operating at said first operating frequency, wherein said first operating frequency is a predetermined maximum operating frequency; and program code configured for determining said second performance metric value derived from said execution of said processor operating at said second operating frequency, wherein said second operating frequency is a final operating frequency entry of a previous frequency probing period.

20. The computer program product of claim 15, further comprising program code configured for resetting to a new frequency probing period in response to detecting a idle processing cycle within a current frequency probing period.

* * * * *